United States Patent [19]

Sareen

[11] Patent Number: 5,265,229
[45] Date of Patent: Nov. 23, 1993

[54] SINGLE LOAD, MULTIPLE ISSUE QUEUE WITH ERROR RECOVERY CAPABILITY

[75] Inventor: Bimal K. Sareen, Marlborough, Mass.

[73] Assignee: Digital Equipment Corporation, Maynard, Mass.

[21] Appl. No.: 547,661

[22] Filed: Jul. 2, 1990

[51] Int. Cl.$^5$ ............................................. G06F 13/00
[52] U.S. Cl. ...................... 395/425; 364/260; 364/260.2; 364/265.1; 364/244.3; 364/DIG. 1
[58] Field of Search ............................. 395/425, 575

[56] References Cited

U.S. PATENT DOCUMENTS

| | | | |
|---|---|---|---|
| 4,451,880 | 5/1984 | Johnson | 395/425 |
| 4,482,956 | 11/1984 | Tallman | 395/250 |
| 4,558,429 | 12/1985 | Barlow | 395/425 |
| 4,779,234 | 10/1988 | Kaneko | 365/221 |
| 4,807,111 | 2/1989 | Cohen | 395/250 |
| 4,894,797 | 1/1990 | Walp | 395/425 |
| 4,949,301 | 8/1990 | Joshi | 395/425 |

FOREIGN PATENT DOCUMENTS

| | | |
|---|---|---|
| 8400836 | 1/1984 | PCT Int'l Appl. |
| 8504776 | 10/1985 | PCT Int'l Appl. |
| 8602510 | 4/1986 | PCT Int'l Appl. |
| 8810468 | 12/1988 | PCT Int'l Appl. |
| 8907795 | 8/1989 | PCT Int'l Appl. |

*Primary Examiner*—Eric Coleman
*Attorney, Agent, or Firm*—William P. Skladony

[57] ABSTRACT

An interleaved output queue is used as a high performance interface on a system bus for transferring information from a CPU to main memory. The queue is loaded on its input side with information that is bound for transmission from the CPU's cache to main memory. The queue itself is logically divided into those queue entry addresses which are either odd or even. On its output side, the queue is unloaded by dual sets of unload circuitry, each of which accesses the information stored in either the odd or even queue entry addresses. Other select circuitry will alternate the transmission of information out of the two sets of unload circuitry to main memory. Each set of unload circuitry receives error information back from main memory during the time that the other unload circuitry is issuing a transaction. As a result, each set of unload circuitry is thereby informed whether its own previous transaction was error free, in which case it will transmit the information contained in its next queue entry address when it next issues a transaction, or whether its previous transaction was not error free, in which case it will next have to resend the same information sent during the previous transaction. Consequently, transactions issued from the queue can proceed in an immediately successive sequence without waiting for the processing of error information from the immediately preceding transaction yet the queue can still recover form errors during high performance operation.

27 Claims, 6 Drawing Sheets

FIGURE 5A

QUEUE WITH SINGLE UNLOAD

| BUS CYCLE # | | | |
|---|---|---|---|
| 37 | D$_2$ | ACK | |
| 36 | D$_1$ | ACK | |
| 35 | D$_0$ | | |
| 34 | C/A | (Q$_2$) | |
| 33 | | | |
| 32 | | | |
| 31 | | | |
| 30 | | | |
| 29 | | ACK | |
| 28 | | ACK | |
| 27 | D$_3$ | ACK | |
| 26 | D$_2$ | ACK | |
| 25 | D$_1$ | ACK | |
| 24 | D$_0$ | | |
| 23 | C/A | (Q$_1$) | |
| 22 | | | |
| 21 | | | |
| 20 | | | |
| 19 | | | |
| 18 | | ACK | |
| 17 | | ACK | |
| 16 | D$_3$ | ACK | |
| 15 | D$_2$ | ACK | |
| 14 | D$_1$ | ACK | |
| 13 | D$_0$ | | |
| 12 | C/A | (Q$_0$) | |
| 11 | | | |
| 10 | | | |
| 9 | | | |
| 8 | | | |
| 7 | | NACK | |
| 6 | | ACK | |
| 5 | D$_3$ | ACK | |
| 4 | D$_2$ | ACK | |
| 3 | D$_1$ | ACK | |
| 2 | D$_0$ | | |
| 1 | C/A | (Q$_0$) | |
| 0 | | | |

FIGURE 5B

QUEUE WITH DUEL UNLOAD

| BUS CYCLE # | EVEN ADDRESS ENTRIES | | ODD ADDRESS ENTRIES | |
|---|---|---|---|---|
| 37 | C/A | (Q$_4$) | | ACK |
| 36 | | | | ACK |
| 35 | | | D$_3$ | ACK |
| 34 | | | D$_2$ | ACK |
| 33 | | | D$_1$ | ACK |
| 32 | | | D$_0$ | |
| 31 | | ACK | C/A | (Q$_5$) |
| 30 | | ACK | | |
| 29 | D$_3$ | ACK | | |
| 28 | D$_2$ | ACK | | |
| 27 | D$_1$ | ACK | | |
| 26 | D$_0$ | | | |
| 25 | C/A | (Q$_2$) | | ACK |
| 24 | | | | ACK |
| 23 | | | D$_3$ | ACK |
| 22 | | | D$_2$ | ACK |
| 21 | | | D$_1$ | ACK |
| 20 | | | D$_0$ | |
| 19 | | ACK | C/A | (Q$_3$) |
| 18 | | ACK | | |
| 17 | D$_3$ | ACK | | |
| 16 | D$_2$ | ACK | | |
| 15 | D$_1$ | ACK | | |
| 14 | D$_0$ | | | |
| 13 | C/A | (Q$_0$) | | ACK |
| 12 | | | | ACK |
| 11 | | | D$_3$ | ACK |
| 10 | | | D$_2$ | ACK |
| 9 | | | D$_1$ | ACK |
| 8 | | | D$_0$ | |
| 7 | | NACK | C/A | (Q$_1$) |
| 6 | | ACK | | |
| 5 | D$_3$ | ACK | | |
| 4 | D$_2$ | ACK | | |
| 3 | D$_1$ | ACK | | |
| 2 | D$_0$ | | | |
| 1 | C/A | (Q$_0$) | | |
| 0 | | | | |

SINGLE LOAD, MULTIPLE ISSUE QUEUE WITH ERROR RECOVERY CAPABILITY

FIELD OF THE INVENTION

The present invention relates to an apparatus and a method for issuing high performance transfers of information from a central processing unit (CPU) within a computer to another location within that computer, while still enabling the CPU to recover from transmission errors on a per transaction basis.

BACKGROUND OF THE INVENTION

Computer systems are typically made up of multiple nodes which are connected together by a system bus which carries information, such as commands, addresses, data, and control signals between the nodes. Examples of the nodes which make up common computer configurations include central processing units, main memory, and I/0 adapters/controllers, which provide interfaces to mass storage devices and networks. When information is transferred over a bus the receiving node will inform the transmitting node whether that information was corrupted during transmission and whether there were any other protocol errors resulting from the transaction. In part, this is accomplished by checking parity bits, which are transferred along with the information.

When the receiving node has confirmed that the transmission is error-free, it will send back an acknowledgment ("ACK") signal to the transmitting node indicating that the information is good. Alternatively, if the information has been corrupted in transmission or any other bus protocol error occurs, the transmitting node does not return an ACK. This failure to return an ACK during the time period required by the bus protocol is logically understood by the transmitting node as a 'no-acknowledgment' ("NACK") signal indicating that the information is not good, and the transmitting node must once again transmit that information.

There is some time delay between the completed transmission of the information to the receiving node, and the determination by the receiving node whether the information was corrupted during transmission and whether there were any other protocol errors. This is because there must be some time for the information to be checked against the parity bit by the bus interface of the receiving node. Thus, if the transmitting node sends information during a first bus cycle, it is common for that node to wait some number of bus cycles before it has an ACK or NACK informing it whether that information is good.

System designs known in the computer architecture art often employ the use of queues for the temporary storage of information which is bound for transmission from one node to another. In a typical implementation, a queue is positioned between a CPU and the interface to the system bus. The CPU will load the queue with information that is to be transferred from the CPU to main memory. An advantage of using the queue in this fashion is that it enhances CPU performance by allowing the CPU to continue processing additional operations before the actual completion of the transfer to main memory. In addition, in the typical implementation the loading of the queue takes place at the same rate at which the CPU operates, which is necessary for maximum performance. The amount of information stored by a output queue is usually sufficient to comprise several transactions. Therefore, a CPU which has a queue is capable of issuing multiple, immediately successive transactions on the system bus as the queue is unloaded.

Although an output queue can issue such multiple, immediately successive transactions, the conventional approach to unloading a queue does not take advantage of this capability because of the need of the system to recover from transmission and bus protocol errors. Specifically, when a NACK results from a given transaction, the system must be able to reissue the transaction so that the information is once again sent from the transmitting node to the receiving node. This conventional approach requires that no successive transaction be commenced until there has been a successful completion of the preceding transaction, or until continuous unsuccessful attempts at transmission of the same information result in a terminating error, known as a "time out".

If, for example, the transmitting node were to commence a second transaction before receiving all of the error information relating to the first transaction, and the first transaction results in an error, the control sub-system of the transmitting node will have to jump back and retransmit the first transaction after transmitting the second transaction. Then, assuming the second transaction is error-free, after the repeated execution of the first transaction, the control sub-system would have to jump ahead to the third transaction, given that there is no need to repeat the second transaction, which was successful. Such a jump back - jump ahead scheme has proven extremely complex, and therefore has not been implemented.

Accordingly, under the conventional unload method, when the information contained in the first queue entry address is transmitted, the system will wait until all of the ACK's have been returned before transmitting the information contained in the second queue entry address. If, however, a NACK is returned, the transaction is repeated. The disadvantage of this approach, however, is that system performance is degraded because the further unloading of the queue is stalled while the node is forced to wait for the ACK's or NACK's relating to a given transaction to be returned. This disadvantage is rather significant in light of the continuing trend for the speed of CPU's to increase, which thereby places a greater demand on system interconnects to issue transactions in an immediately successive order. On the other hand, if the output queue's ability to issue multiple, immediately successive transactions is to be used, the design of the unload system for the queue must be capable of recovering from errors when the original or subsequently attempted transactions result in at least one NACK. Such error recovery capability is a protocol requirement of some advanced system buses.

In accordance with an aspect of the present invention, there is provided a single output queue which is loaded through one set of load circuitry which operates at the same speed as the CPU.

In another aspect of the invention the single output queue is logically divided into two separate logical queues; the two logical queues being made up of those physical queue entry address locations that are even, and those physical queue entry address locations that are odd.

Another aspect of the invention is to access the odd and even queue entry addresses through two separate sets of unload circuitry, which thereby permits rapid unloading of the queue and enhances system performance.

Still another aspect of the invention is to alternate between the unloading of odd and even queue entry addresses so that while one transaction is underway, the immediately preceding transaction can check its own error information to determine whether it should resend the information in the same queue entry address again, or proceed to the next queue entry address. Moreover, this determination by the first half of the logical queue is done independent of the transaction issuance state of the other half of the logical queue. Therefore, the dual access system permits unloading at high performance, but also provides a sophisticated method of error recovery which is practical to implement.

SUMMARY OF THE INVENTION

In accordance with the present invention, an output queue for writing information from a CPU to main memory is logically divided into its odd and even queue entry addresses. The queue has a single load path on its input side, allowing the loading speed to be the same as the operating speed of the CPU. Associated with the queue is a dual set of unload circuitry, one set of which accesses the odd queue entry addresses and the other accesses the even queue entry addresses. Further associated with each set of unload circuitry is an address pointer and error response circuitry. Ultimately, the unload circuitry is connected to the system bus for transmitting information out of the queue to main memory.

After the queue is loaded with information it is emptied through the unload circuitry. Specifically, the even address circuitry accesses the information stored in the first even queue entry address, and transmits that information to main memory. Immediately thereafter, the odd address circuitry accesses the information stored in the first odd queue entry address and transmits that information to main memory. While the second transaction is underway, parity and protocol error information relating to the first transaction is evaluated by the error response circuitry to determine whether the address pointer for the even queue entry addresses should be advanced to the next even address of the queue. If an error in the first transaction is detected, the address pointer will be stalled so that immediately following the completion of the second transaction, the first transaction will be repeated.

Likewise, while the information in the first even queue entry address is being retransmitted, parity and protocol error information relating to the second transaction is evaluated by the error response circuitry to determine whether the address pointer for the odd queue entry addresses should be advanced to the next odd queue entry address. Assuming that the second transaction was error-free, the odd address counter will advance so that the second odd queue entry address information will be transmitted as soon as the retransmission of the first even queue entry address is completed.

The unloading of the queue will generally continue this ordered sequence of accessing odd and even queue entry addresses in like fashion until the queue is empty. Thus, the queue functions as a high performance interface between the CPU and main memory, being loaded on its input side at the same operating speed as the CPU. Moreover, due to its ability to reissue a transaction which resulted in an error, the queue can continue high performance operation even under error recovery conditions.

BRIEF DESCRIPTION OF THE DRAWING

FIG. 5A is a timing diagram that shows the performance of an output queue using a conventional, single unload approach, while FIG. 5B is a similar timing diagram that shows the performance of an output queue using the dual unload approach of the present invention.

DESCRIPTION OF THE PREFERRED EMBODIMENT

The present invention relates to a queue which is loaded through one set of load circuitry which operates at the high performance speed of the CPU, and unloaded through multiple sets of unload circuitry. The exact number of sets of unload circuitry is determined by logically dividing the queue into some number of interleaved, queue entry addresses and issuing transactions from those addresses in an ordered sequence. Consequently, through using this interleaved, transaction issuance approach the queue provides a high performance interface with the system bus.

In the preferred embodiment of the invention the queue is designed to write information from a CPU to main memory through the use of a single, circular queue with dual unload circuitry. A circular queue is a queue which is loaded with information, and as it is unloaded, the queue entry addresses which have been emptied are then available for additional information to be loaded again. The use of this queue substantially improves system performance by having transactions on the system bus proceed one right after the other, without any given transaction having to be acknowledged as error-free before commencing the next transaction. The issuance of transactions in this manner, namely commencing one transaction before receiving back complete error information regarding the immediately preceding transaction, shall hereafter be defined as "multiple, immediately successive transactions". In addition, even though transactions can proceed in this tightly ordered sequence, the interleaved write-back approach is capable of recovering from transmission errors using a sophisticated, but practical to implement, error recovery scheme.

Figure 1:
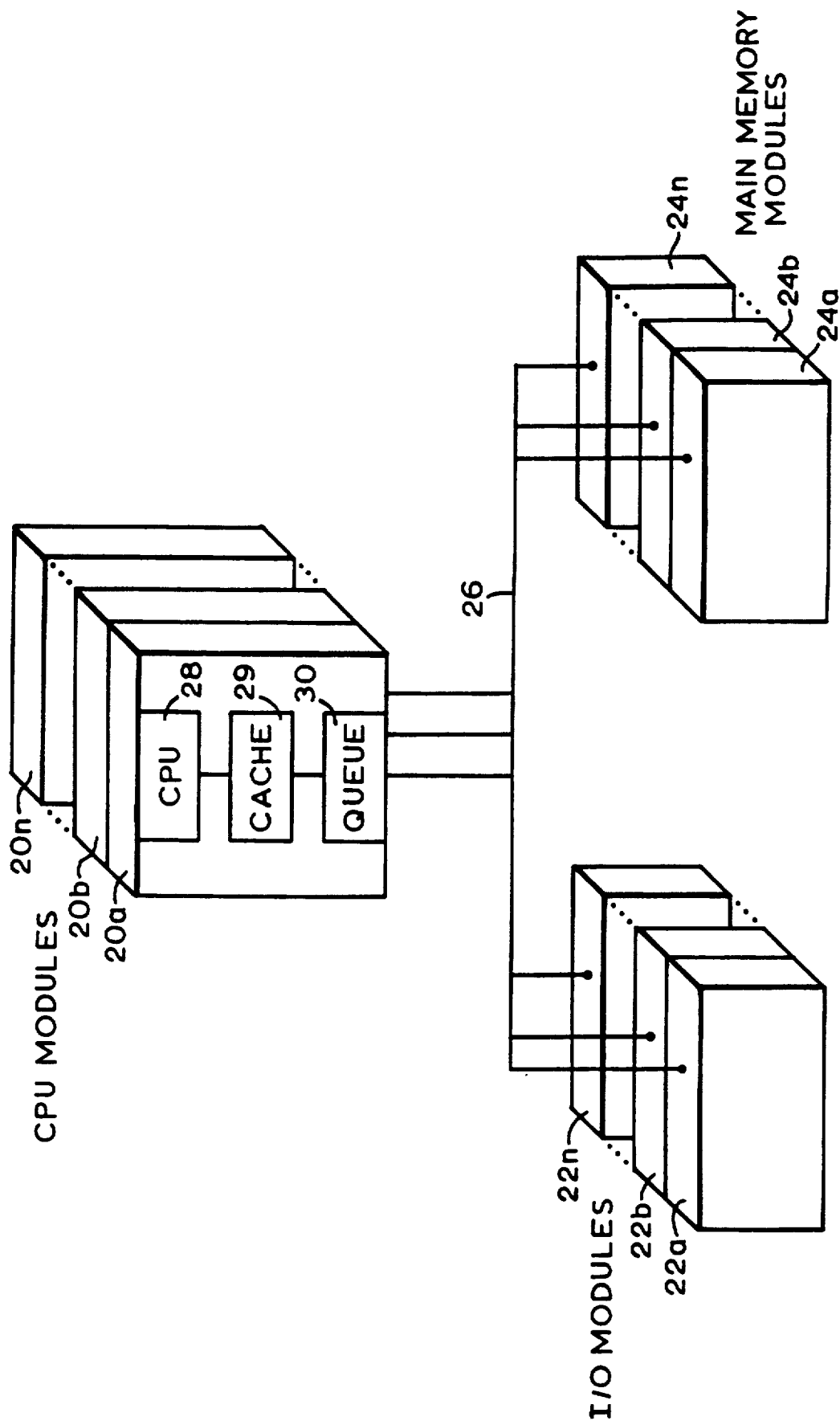
FIG. 1 is a general system overview showing multiple CPU modules each having a write-back queue, multiple I/0 modules, and multiple main memory modules all linked together by a system bus.

Referring now to the drawing, FIG. 1 shows a computer system, including multiple, identical CPU modules 20(a-n), multiple, identical input/output (I/0) modules 22(a-n), and multiple, identical main memory modules 24(a-n). The illustration shows 'n' number of CPU modules, I/0 modules, and main memory modules because the exact number of CPU, I/O, and main memory modules can vary according to system use and performance objectives. These modules are linked together through a system bus 26, which in the preferred embodiment is Digital Equipment Corporation's XMI bus. Also shown in FIG. 1, the CPU module 20 has a CPU 28 which is connected to a cache 29, which, in turn, is connected to the output queue 30. The queue 30 is positioned between the cache 29 and the system bus 26. Although not shown in FIG. 1, in a multiprocessor environment all of the CPU modules would be identically configured with their own CPU's, caches and queues.

Figure 2:
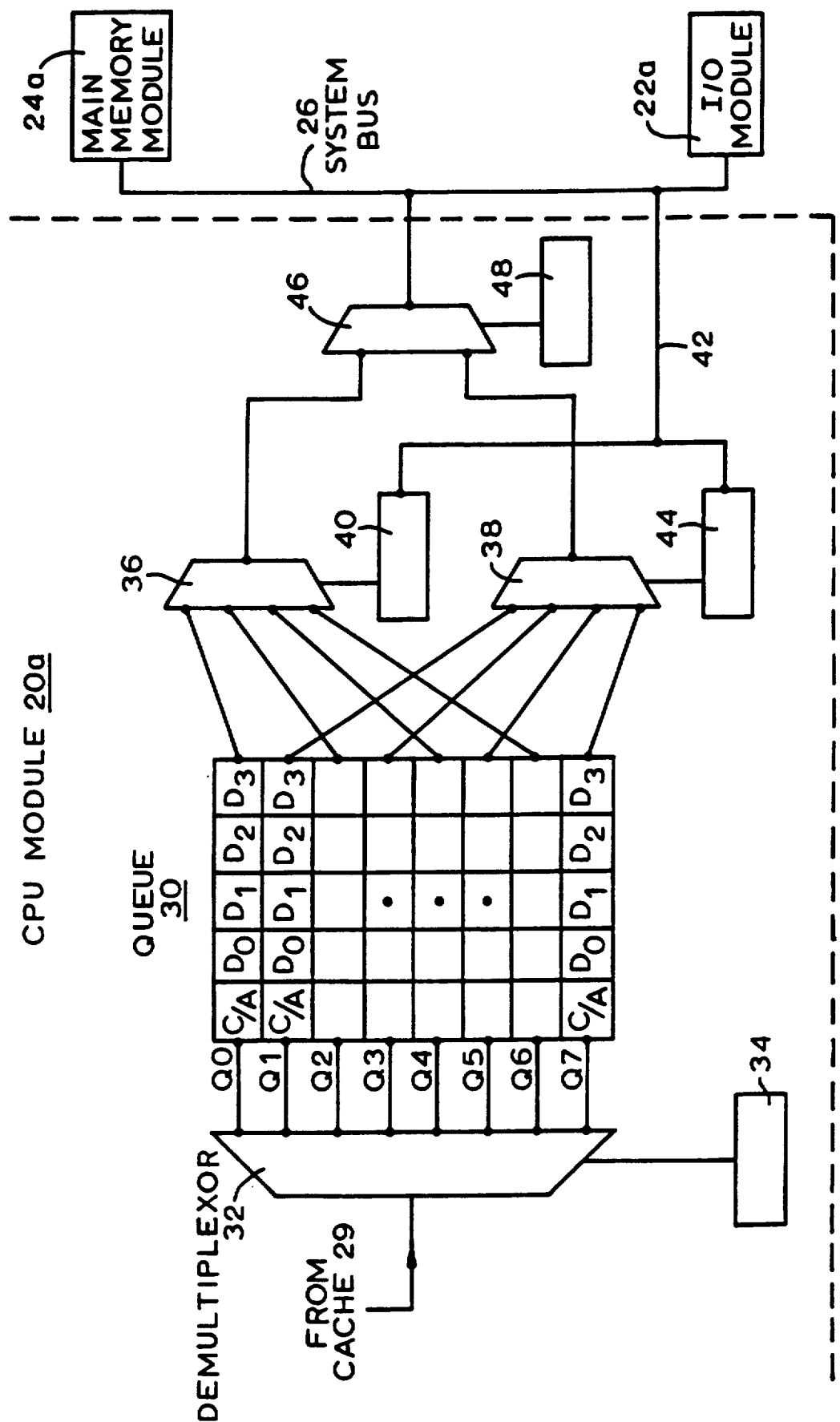
FIG. 2 is an illustration of the output queue with its related load and unload circuitry.

In FIG. 2, the output queue 30 is shown along with the block circuitry that loads it on its input side and unloads it on its output side. Specifically, information, such as commands, addresses, and data, are sent from the cache 29 and are loaded into the queue 30 through the demultiplexor 32, which has an input and an output side and which is controlled by the load control 34. The demultiplexor 32 and its associated load control 34 are responsible for filling the various queue entry addresses of the queue 30 with commands, addresses, and data which are sent by the cache 29 to the main memory module 24. The queue 30 has eight queue entry address locations (Q0–Q7) and each queue entry address location is capable of holding five quadwords (1 quadword = 64 bits), one of those quadwords typically being a command (C) together with an address (A) and the other four quadwords being data (D0, D1, D2, D3). Although in this implementation of the invention the queue 30 has eight queue entry addresses and five quadwords in each queue entry address, the actual number of queue entry addresses and words, and the actual word size may vary depending upon design factors and goals.

Although the conventional method of unloading an output queue would involve the use of a single multiplexer to empty the various queue entry address locations, FIG. 2 shows the queue 30 connected to two multiplexers, even queue multiplexer 36 and odd queue multiplexer 38. Through the queue multiplexers 36, 38 the queue 30 can be accessed at multiple points for the purpose of unloading the information contained its eight queue entry address locations. Even though the queue 30 is physically only one queue, it logically has the same functionality as two separate queues; the two logical queues being defined by the queue entry addresses which are either odd or even. The unloading of the queue 30 will proceed with the emptying of first an even queue entry address, such as Q0, then an odd queue entry address, such as Q1, then an even queue entry address, such as Q2, and so on. Furthermore, other implementations of the invention can divide the queue 30 into multiples of any number depending upon design and performance factors; however, additional queue divisions would necessitate the implementation of additional unloading multiplexers, similar to the queue multiplexers 36, 38, and their related unload control circuitry.

The input sides of the queue multiplexers 36, 38 are connected to the output side of the queue 30, and can unload the queue 30 by accessing its eight queue entry address locations. As shown in FIG. 2, even queue multiplexer 36 is connected to the even queue entry addresses of queue 30 (Q0, Q2, Q4, Q6), and odd queue multiplexer 38 is connected to the odd queue entry addresses of queue 30 (Q1, Q3, Q5, Q7). Even queue multiplexer 36 is controlled by even unload control 40 which is a block representation which includes the control circuitry that determines which queue entry address of the queue 30 even queue multiplexer 36 will be accessing during any given transaction. This control circuitry is comprised of an address pointer which enables even queue multiplexer 36 to access each of the even queue entry addresses within queue 30. The incrementing of the address pointer is determined by error response circuitry, which is also contained in even unload control 40.

The error response circuitry receives and reacts to parity and protocol error information, the ACK's and NACK's, resulting from the transmission of information to the main memory 24. After receiving and processing this information the error response circuitry determines whether the address pointer for even queue multiplexer 36 should be advanced to the next address, or should be stalled at the same address because an error has necessitated a retransmission of the information in the same queue entry address location. Therefore, even unload control 40 is connected to the system bus 26 through the error state lines 42. The error state lines 42 carry parity and protocol error information back to even unload control 40 in the form of ACK and NACK signals. The effects that this error information has on accessing information in the queue 30 by queue multiplexers 36, 38 shall be further detailed in connection with the discussion of FIGS. 5A and 5B, below.

As shown in FIG. 2, odd queue multiplexer 38 is similarly controlled by odd unload control 44, the contents and function of which are virtually identical to even unload control 40, except that it determines which odd queue entry addresses of queue 30 odd queue multiplexer 38 will be accessing during any given transaction. Odd unload control 44 contains an address pointer which is controlled by error response circuitry which is similar to the address pointer and error response circuitry of even unload control 40. In addition, odd unload control 44 is connected to the system bus 26 through the error state lines 42 so that the error response circuitry can determine whether the address pointer should be incremented after a given transaction, or whether the same transaction will have to be repeated.

Finally, in FIG. 2 the output sides of the queue multiplexers 36, 38 are connected to the input sides of the select multiplexer 46, while the output side of select multiplexer 46 is connected to the system bus 26. The select multiplexer 46 is controlled by the select control 48, and together they determine which of the two queue multiplexers 36, 38 transmits its information on the system bus 26. Under most circumstances, the select control 48 causes the select multiplexer 46 to toggle between the queue multiplexers 36, 38 so that the select multiplexer 46 alternates between transmitting the information contained in an even queue entry address, then the information contained in an odd queue entry address, then an even queue entry address, and so on. In the meanwhile, the queue multiplexers 36, 38 and their related unload controls 40, 44 are responsible for determining which even or odd queue entry address, respectively, is transmitted to the select multiplexer 46.

Figure 3:
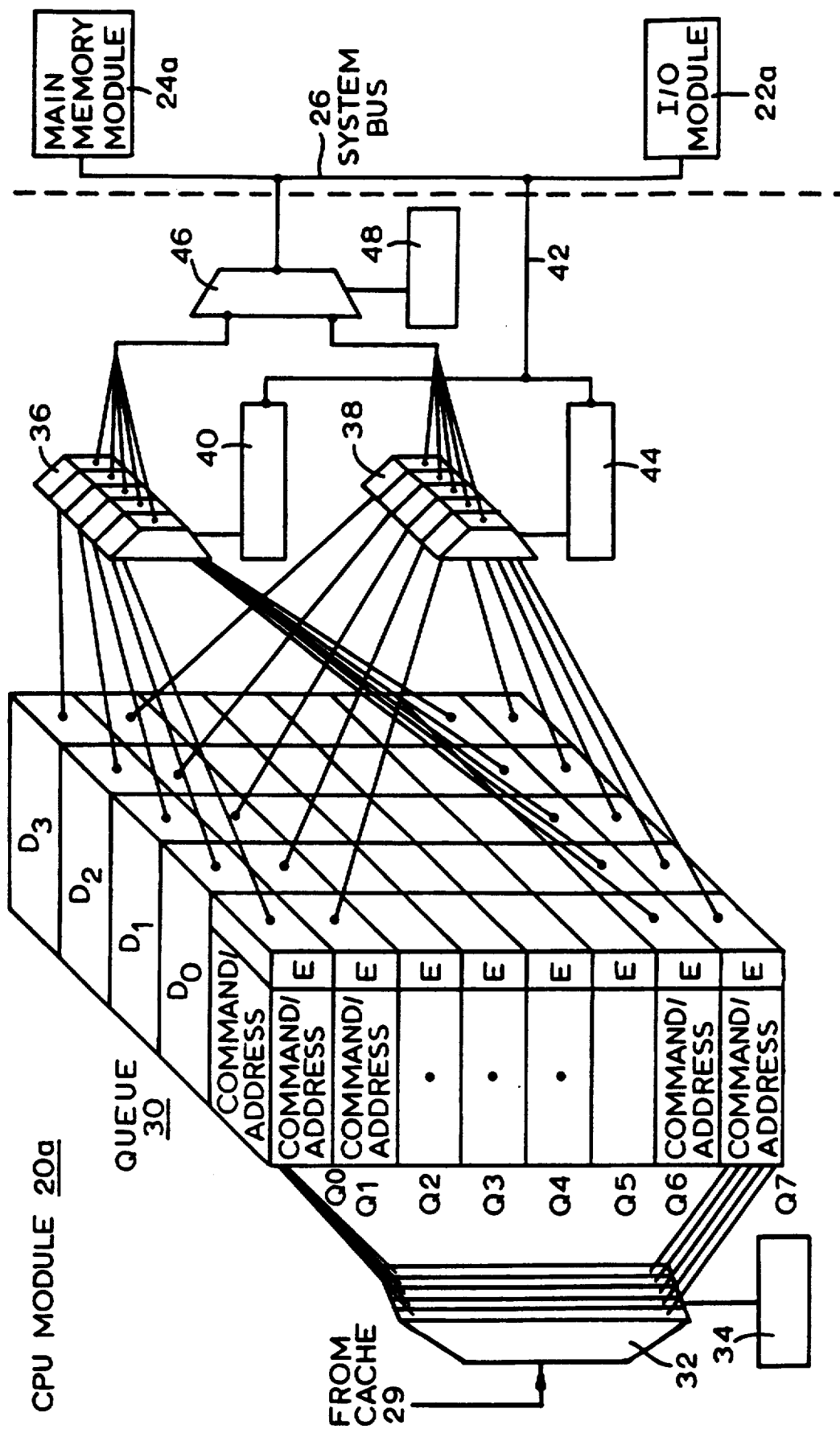
FIG. 3 is a more detailed illustration of the output queue, using a three dimensional characterization to show the multiple blocks of information stored in the individual queue entry address locations.

FIG. 3 shows the same essential features of the queue 30 and its related loading and unloading circuitry as shown in FIG. 2; however, it does so with enhanced detail. The three dimensional character of the drawing is intended to illustrate that each of the eight queue entry addresses of the queue 30 is actually made up of multiple blocks of information. That information, in the form of commands, addresses, and data, comprises blocks of 64 bits each, and each transaction has associated error status information which is generally designated by the letter "E". The demultiplexor 32 is shown in three dimensional form because it must not only be able to distinguish between the eight queue entry address locations of the queue 30 when it is filling it with information, but it also must be able to distinguish between the five blocks of information at any given queue entry address. Similarly, the queue multiplexers 36, 38 are also shown three dimensionally because they, too, must each be able to distinguish between not only their four respective queue entry addresses when unloading, but also the five blocks of information at any given queue entry address.

All of the actual connections between the demultiplexor 32 and the queue 30, and the queue 30 and the queue multiplexers 36, 38 are not shown in FIG. 3 in the interest of preserving the clarity of the illustration. In an actual implementation of the invention, those connections, however, would be made in a fashion similar to the connections that are shown on FIG. 2, all of those connections being shown generally on FIG. 2.

Figure 4:
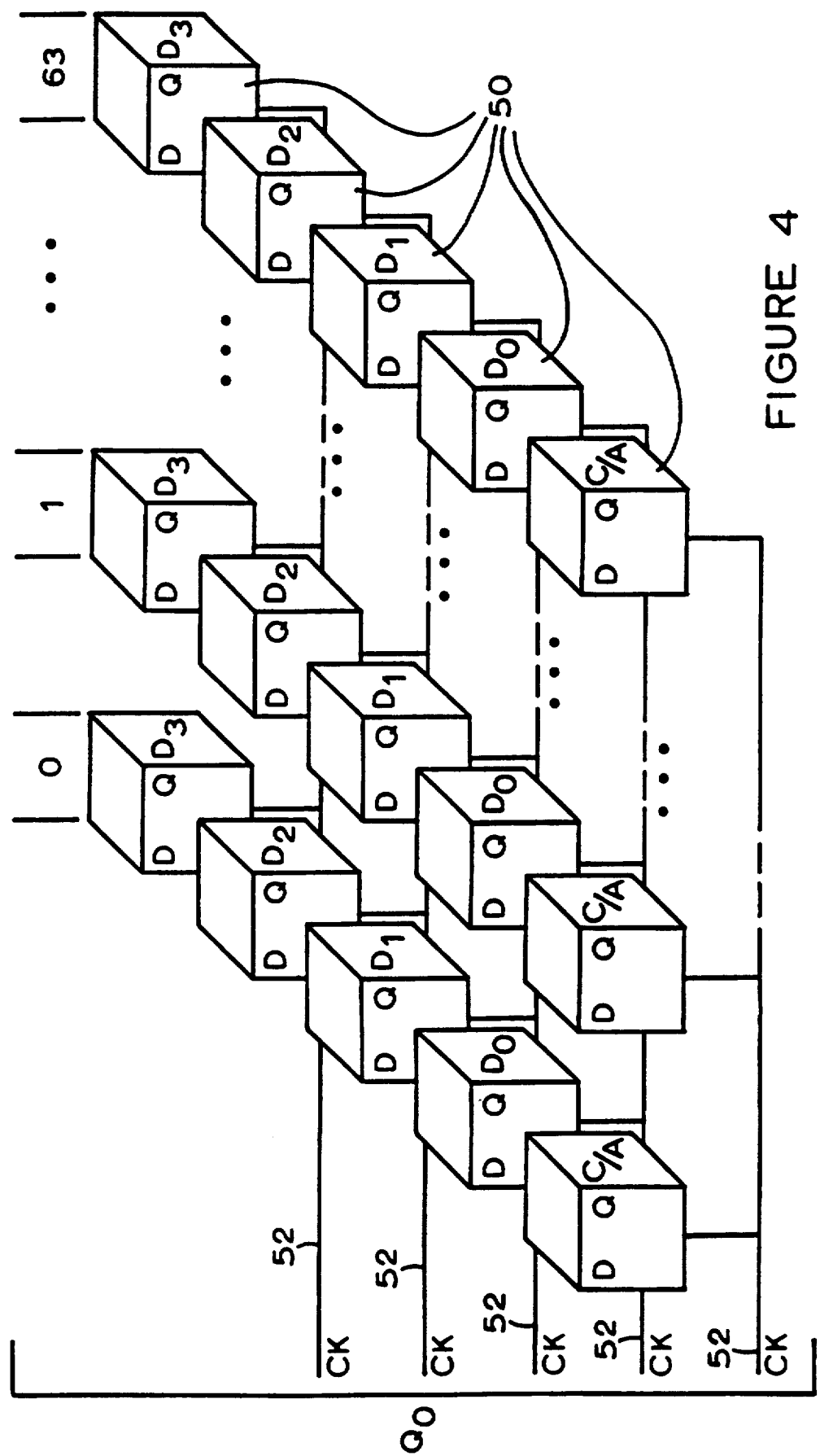
FIG. 4 is a representation of the D latches that comprise the output queue storage locations.

Referring to FIG. 4, the individual memory cells of the queue 30 are made up of D latches 50 which are enabled using a signal on the clock 52; however, in another embodiment of the invention, the individual memory cells of the queue 30 can be made up of any storage means which meets the performance needs of the system.

FIG. 4 shows the five information blocks, each containing 64 bits, which make up the information stored at one single queue entry address of the queue 30, in this instance Q0 is shown. In the preferred embodiment, the first block contains a command (C), such as a write command, and an address (A), and the next four blocks contain data (D0, D1, D2, D3). The function of the command is to provide main memory with an instruction as to what it is supposed to do with the data which will be following the C/A block, while the address informs main memory what address is to be associated with the command and the data. Thus, a write command would instruct main memory to write the four following blocks of data beginning with the address sent along with the write command.

When a queue entry address is accessed, the given queue multiplexer, 36 or 38, will first send the C/A block stored at that queue entry address as a complete block of 64 bits. The queue 30 will next send D0 as another complete block of 64 bits, followed by D1, and so on until all five blocks at that given queue entry address have been sent. The transmission of these five related blocks of information comprise a single "transaction".

According to the XMI bus protocol, after the transmission of the first block of information, which is made up of the C/A, the main memory 24 must return an ACK signal to confirm that that block of information was without error. If no such acknowledgment is received during the assigned time period, the absence of the confirmation is interpreted as a NACK, which means there has been an transient error in transmission or some protocol error and the information must be retransmitted.

Referring now to FIG. 5A, a timing diagram is shown for an output queue which uses the conventional, single unload method. Along the top of the diagram are bus cycle numbers, below which is shown the information that is transmitted during those bus cycles Assuming that the conventional queue is prepared to transmit information to main memory, during cycle #0, the CPU module will arbitrate for the bus. In this example, access to the system bus has been granted during cycle #0; the granting of access having been determined by the priority level assigned to the CPU module through the arbitration scheme. During cycle #1 the queue will transmit the C/A from the first block of Q0, and during the following four cycles, ##2-5, it will transmit D0-D3 from the remaining four blocks of Q0.

According to the XMI bus protocol, ACK and NACK signals from main memory are not received by the CPU module until two cycles after a given block of information is sent by the CPU module. Therefore, during cycle #3 the queue is sending D1 to main memory over the data lines of the bus, while main memory is returning an ACK, which relates to the C/A, on the separate error state lines. During cycle #4 the queue is sending D2 to main memory, while main memory is returning an ACK which relates to D0, and so on with the succeeding cycles. Accordingly, information and error state signals may be traveling in opposite directions on the bus at any given time because they are on distinct lines.

Still referring to FIG. 5A, the performance limitations of emptying the conventional output queue can be seen. Specifically, after the transmission of the C/A and D0-D3 during cycles ##1-5, which together comprises a single transaction, the complete error state information on that transaction will not be received until cycle #7. During cycles ##8-10 the error logic for the conventional queue will have to process the error information from that first transaction to determine which queue entry address will next be accessed. Given that a NACK was returned during cycle #7, meaning that there was an error resulting from D3, the queue will have to retransmit all of the information contained in Q0. Therefore, during cycle #11 the CPU module arbitrates for and, according to the example, is granted access to the bus. Thereafter, the information contained in Q0 is retransmitted commencing with cycle #12.

Because of the delay in the receipt of error information and because of the need to be able to recover from errors, the conventional approach is to wait until all of the acknowledgment signals have been received before again arbitrating for the bus and attempting the next transaction. As a result, in the conventional method the issuance of the next transaction is simply stalled until the preceding transaction is successfully completed, or a time out error terminates further attempts at transmitting the transaction. On the other hand, it is clear that the overall performance of the unloading system is impaired in that four cycles per transaction are wasted while the system waits for the error logic to process the ACK's/NACK's.

The unloading performance of the queue 30 can be substantially improved through the use of the present invention. Referring now to FIG. 5B, a timing diagram similar to FIG. 5A is shown; however, in this instance, the timing diagram reflects the dual unload approach using the queue 30, the queue multiplexers 36, 38, the unload controls 40, 44, the select multiplexer 46 and the select control 48, as discussed above in connection with FIGS. 2 and 3.

As shown in FIG. 5B, during cycle #0 the CPU module 20 arbitrates for and is granted access to the system bus 26. Similar to the example illustrated through FIG. 5A, the queue 30 likewise commences the unloading of the first even queue entry address, Q0, during cycle #1 by transmitting the first block of information, namely C/A, followed by the four data blocks, D0-D3, during the four succeeding clock cycles. Again, acknowledgments relating to any given block of information will be received by the even unload control 40 two cycles after the information is sent. Consistent with the example given in FIG. 5B, the transmission of D3 has resulted in a NACK, which is received during cycle #7. In this instance, however, during cycle #6 the CPU module 20 has arbitrated for and been granted access to the system bus 26 thus enabling it to commence a second transaction, namely the unloading of the first odd queue entry address, Q1, commencing with cycle #7.

It is important to note that the XMI bus protocol requires at least one bus cycle between transactions during which no command, address, or data information is on the bus, so that other nodes may attempt to gain bus access according to their respective orders of priority. In the example illustrated in this timing diagram, cycle #6 is this inactive cycle, and also in this example no other node has been granted access which delays the continued write-back operation of the queue 30.

Still referring to FIG. 5B, before even unload control 40 receives back all of the error information relating to the first transaction, odd queue multiplexer 38, which accesses the odd queue entry addresses, will transmit the information contained in Q1 commencing with cycle #7. While this second transaction is underway, the error response circuitry contained in even unload control 40 will process the ACK's/NACK's relating to the first transaction, and thereby determine whether the address pointer for even queue multiplexer 36 should be advanced to point to the next even queue entry address of queue 30. If a NACK relating to the first transaction is received, as is shown in FIG. 5B during cycle #7, that address pointer will be stalled at Q0, so that all of the information contained in Q0 is retransmitted, as is shown commencing with cycle #12.

A NACK relating to any one of the five blocks comprising the first transaction would have caused a retransmission of Q0; however, the latest returning error signal, namely the one returned during cycle #7, was chosen to illustrate that the system can recover from errors, with high performance, even if they are not detected until the last return cycle relating to a given transaction.

Similarly, while the information contained in Q0 is retransmitted during cycles ##13-17, the error response circuitry contained in odd unload control 44 will process the ACK's/NACK's relating to the second transaction, and thereby determine whether the address pointer for odd queue multiplexer 38 should be advanced to point to the next odd queue entry address of queue 30. In accordance with the example shown in FIG. 5B, the second transaction involving the transmission of the information contained in Q1 was error-free; all of the ACK's were received. Therefore, the odd address pointer will be incremented so that the fourth transaction will involve the transmission of the next odd queue entry address, Q3, as shown commencing with cycle #19.

Assuming that the second attempt at transmitting the information contained in Q0 is error-free, the even address pointer will be similarly incremented during the fourth transaction, which involves the transmission of the information contained in Q3, so that it next points to Q2. After the completion of the transmission of the information in Q3, even queue multiplexer 36 will transmit the information contained in Q2. The alternating transmission of the information contained in the odd and even queue entry addresses of the queue 30 will continue in this ordered sequence until the queue 30 is emptied, or the last pending transaction times out as a result of repeated unsuccessful transmission attempts.

As can be seen by comparing FIGS. 5A and 5B, the present invention can almost double the transmission performance of the queue 30. Referring specifically to the transaction issuance of the single unload queue and the dual unload queue during cycles ##0-13, it can be seen that by the time the single unload queue commences its second transaction, during cycle #12, the dual unload queue is very close to completing its second transaction, that second transaction actually being completed during cycle #13. This very substantial performance improvement is a direct result of the ability of the queue 30 to be able to issue multiple, immediately successive transactions, while maintaining a high performance single load path to the queue 30.

Figure 6:
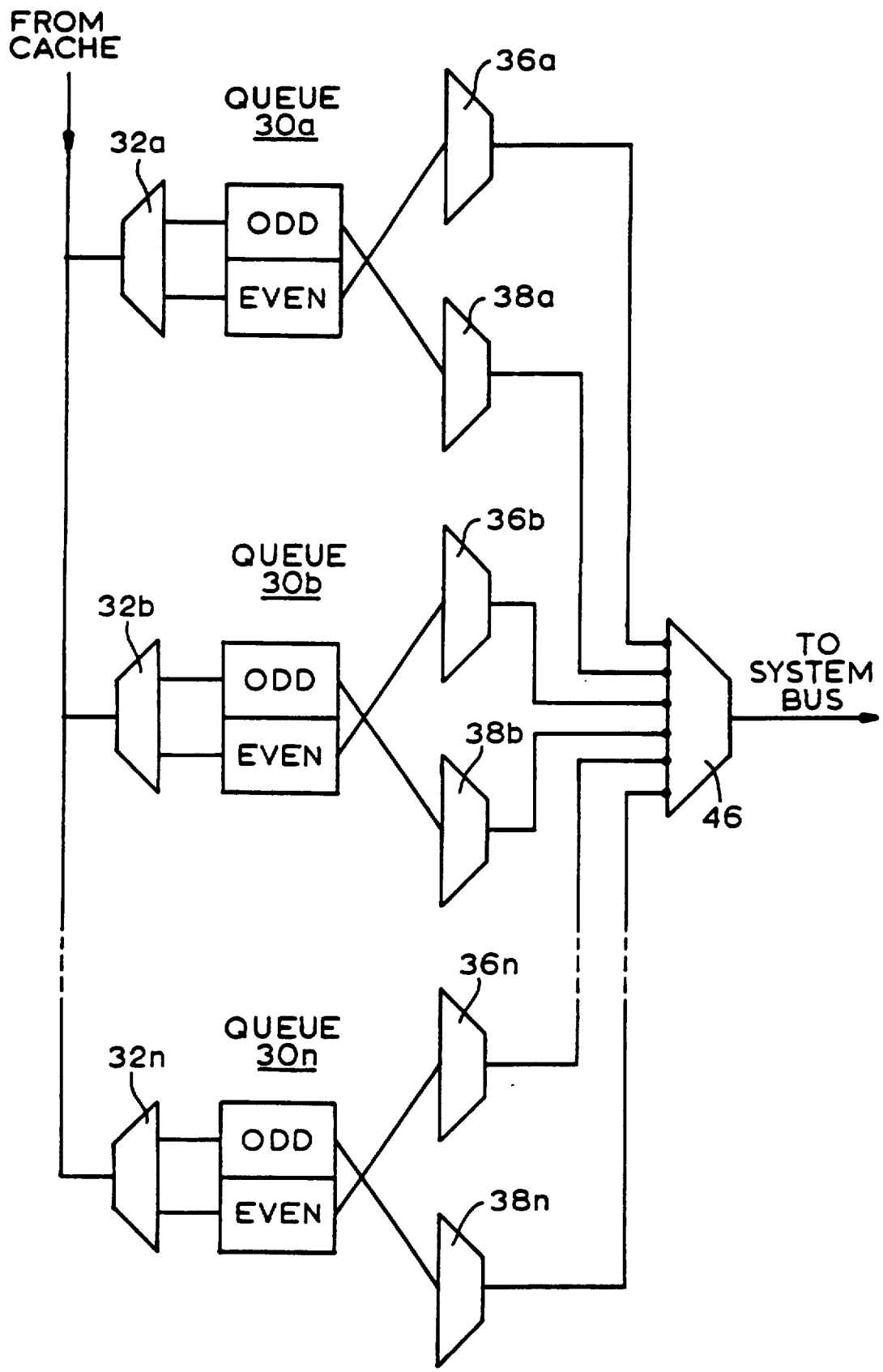
FIG. 6 illustrates an alternate embodiment of the present invention, showing multiple, dual unload output queues linked together to achieve even higher transaction performance than one, dual unload output queue.

A further advantage of the present invention is that its application may be extended to include multiple output queues. As shown in FIG. 6, 'n' number of identical output queues 30(a-n), with their related demultiplexors 32(a-n), even queue multiplexers 36(a-n) and odd queue multiplexers 38(a-n), are connected to the select multiplexer 46. Although this drawing does not include the detail of FIGS. 2 and 3, each queue would be identical to the queue 30 and its related loading and unloading circuitry as shown and discussed in connection with FIGS. 2 and 3. As can be seen, the present invention can be replicated any number of times if the performance goals of the system require very high speed transaction issuance. Such a design approach could yield significant benefits in a pipelined computer system where high transaction issuance bandwidth is needed.

In addition, the present invention is not limited to the transmission of information between a CPU module and main memory, only. Rather the invention is applicable to transmissions between any high speed cache structures on a pended bus. For example, an I/0 module which is configured with a high speed cache could implement this unload approach to improve its performance.

Accordingly, additional advantages and modifications will readily occur to those skilled in the art. The invention in its broader aspects is therefore not limited to the specific details, representative apparatus, and illustrative examples shown and described above. Thus, departures may be made from such details without departing from the spirit or scope of the invention.

What is claimed is:

1. An apparatus for issuing transactions from a first node within a computer system to a second node within a computer system, said apparatus comprising:
- a queue having a plurality of queue entry addresses for electronically storing information;
- a loading means for loading information into said queue, said loading means being adapted for electrical coupling with a first node such that with said loading means electrically coupled to a first node said loading means receives information sent from a first node, and said loading means being electrically coupled with said queue such that said loading means loads information into said queue entry addresses;

a first unloading means electrically coupled to a first group of queue entry addresses for transferring information contained in said first group of queue entry addresses to a second node;

a second unloading means electrically coupled to a second group of queue entry addresses, which are different from said first group of queue entry addresses, for transferring information contained in said second group of queue entry addresses to a second node; and means for alternately enabling said first and second unloading means to issue multiple, immediately successive transactions from said queue, said enabling means being adapted for coupling with a second node for receiving error state information from a second node, which indicates that a given transmission of data from a given queue entry address to a second node was erroneous, said error state information being used by said enabling means to cause a data transmission which results in an error to be repeated.

2. An apparatus as in claim 1, wherein said loading means includes a demultiplexor.

3. An apparatus as in claim 1, wherein said first unloading means includes a queue multiplexer.

4. An apparatus as in claim 3, wherein said enabling means includes an address pointer for indicating which single queue entry address said multiplexor unloads during a given transaction.

5. An apparatus as in claim 4, wherein said enabling means further includes error response circuitry, which is responsive to error state information from a second node for providing a signal to increment said address pointer if the immediately preceding transaction executed by said queue multiplexer did not result in an error.

6. An apparatus as in claim 1, wherein said enabling means includes a select multiplexer which is electrically coupled to said first and second unloading means for determining which one of said first and second unloading means transmits information to a second node during any given transaction.

7. An apparatus for issuing transactions from a central processing unit (CPU) module within a computer system to a main memory, said apparatus comprising:

a queue having a plurality of queue entry addresses for electronically storing information;

a loading means for loading information into said queue, said loading means being adapted for electrical coupling with a CPU module such that with said loading means electrically coupled to a CPU module said loading means receives information sent from a CPU module, and said loading means being electrically coupled with said queue such that said loading means loads information into said queue entry addresses;

a first unloading means electrically coupled to a first group of queue entry addresses for transferring information contained in said first group of queue entry addresses to a main memory;

a second unloading means electrically coupled to a second group of queue entry addresses, which are different from said first group of queue entry addresses for transferring information contained in said second group of queue entry addresses to a main memory; and means for alternately enabling said first and second unloading means to issue multiple, immediately successive transactions from said queue, said enabling means being adapted for coupling with a main memory for receiving error state information from a main memory, which indicates that a given transmission of data from a given queue entry address to a main memory was erroneous, said error state information being used by said enabling means to cause a data transmission which results in an error to be repeated.

8. An apparatus as in claim 7, wherein said loading means includes a demultiplexor.

9. An apparatus as in claim 7, wherein said first unloading means includes a queue multiplexer.

10. An apparatus as in claim 9, wherein said enabling means includes an address pointer for indicating which single queue address said queue multiplexor unloads during a given transaction.

11. An apparatus as in claim 10, wherein said enabling means further includes error response circuitry, which is responsive to error state information from a main memory for providing a signal to increment said address pointer if the immediately preceding transaction executed by said queue multiplexer did not result in an error.

12. An apparatus as in claim 7, wherein said enabling means includes a select multiplexer which is electrically coupled to said first and second unloading means for determining which one of said first and second unloading means transmits information to a main memory during any given transaction.

13. An apparatus for issuing write-back transactions from a central processing unit (CPU) module within a computer system to a main memory, said apparatus comprising:

a write-back queue having a plurality of queue entry addresses for electronically storing information, said queue entry addresses being logically divided into even and odd queue entry address locations;

a loading means for loading information into said queue, said loading means being adapted for electrical coupling with a CPU module such that with said loading means electrically coupled to a CPU module said loading means receives information sent from a CPU module, and said loading means being electrically coupled with said queue such that said loading means loads information into said queue entry addresses;

a first unloading means electrically coupled to said even queue entry addresses for transferring information contained in said even queue entry addresses to a main memory;

a second unloading means electrically coupled to said odd queue entry addresses for transferring information contained in said odd queue entry addresses to a main memory; and means for alternately enabling said first and second unloading means to issue multiple, immediately successive transactions from said queue, said enabling means being adapted for coupling with a main memory for receiving error state information from a main memory, which indicates that a given transmission of data from a given queue entry address was erroneous, said error state information being used by said enabling means to cause a data transmission which results in an error to be repeated.

14. An apparatus as in claim 13, wherein said loading includes a demultiplexor.

15. An apparatus as in claim 13, wherein said first unloading means includes a queue multiplexer.

16. An apparatus as in claim 15, wherein said enabling means includes an address pointer for indicating which single queue entry address said queue multiplexor unloads during a given transaction.

17. An apparatus as in claim 16, wherein said enabling means further includes error response circuitry, which is responsive to error information from a main memory for providing a signal to increment said address pointer if the immediately preceding write-back transaction executed by said queue multiplexer did not result in an error.

18. An apparatus as in claim 13, wherein said enabling means includes a select multiplexer which is electrically coupled to said unloading means for determining which one of said first and second unloading means transmits information to a main memory during any given transaction.

19. A method of unloading information from a first node in a computer to a second node in a computer comprising the steps of:

loading a queue, which has a plurality of queue entry addresses, with information from a first node;

logically grouping all of said queue entry addresses into first and second queue entry address groups, the second group of queue entry address groups being different from the first;

using first and second unloading means, which are each respectively coupled to said first and second queue entry address groups, to unload said queue by having said unloading means alternately transmit information out of their respective queue entry address groups in multiple, immediately successive transactions; and using error state information from a second node, which indicates that a given transmission of data from a given queue entry address to a second node was erroneous, to cause a data transmission which results in an error to be repeated.

20. The method as in claim 19, further comprising the step of:

using an address pointer for indicating the single queue entry address of a given address group which is unloaded during a given data transmission.

21. The method as in claim 20, further comprising the step of:

incrementing the address pointer to the next address if the error state information from the previous data transmission out of the address group with which the pointer is associated did not indicate that the previous transmission was in error.

22. A computer system comprising:

first and second nodes, a queue having a plurality of queue entry addresses for electronically storing information which is transferred by said first node to said second node;

a loading means for loading information into said queue, said loading means being electrically coupled with said first node for receiving information sent from said first node, and said loading means being electrically coupled with said queue for loading information into said queue entry addresses;

a first unloading means electrically coupled to a first group of queue entry addresses for transferring information contained in said first group of queue entry addresses to said second node;

a second unloading means electrically coupled to a second group of queue entry addresses, which are different from said first group of queue entry addresses, said second unloading means being for transferring information contained in said second group of queue entry addresses to said second node;

said second node transmitting error state information to said first node indicating whether the transfer of any of information from said first node to said second node was in error; and means for alternately enabling said first and second unloading means to issue multiple, immediately successive transactions from the queue entry addresses to which they are respectively coupled, said enabling means being coupled to said second node to receive the error state information, which is used by said enabling means to cause a transmission which results in an error to be repeated.

23. An apparatus as in claim 22, wherein said loading means includes a demultiplexor.

24. An apparatus as in claim 22, wherein said first unloading means includes a queue multiplexer.

25. An apparatus as in claim 24, wherein said enabling means includes an address pointer for indicating which single queue entry address said multiplexor unloads during a given transaction.

26. An apparatus as in claim 25, wherein said enabling means further includes error response circuitry which is responsive to error state information from said second node for providing a signal to increment said address pointer if the immediately preceding transaction executed by said queue multiplexer did not result in an error.

27. An apparatus as in claim 26, wherein said enabling means includes a select multiplexer which is electrically coupled to said unloading means for determining which one of said first and second unloading means transmits information to said second node during any given transaction.

* * * * *